United States Patent
Larson et al.

(10) Patent No.: US 7,633,722 B1
(45) Date of Patent: Dec. 15, 2009

(54) DISK DRIVE ACTUATOR ROTARY BEARING ATTACHMENT WITH CAM MEMBER

(75) Inventors: Nils E. Larson, San Jose, CA (US); Michael K. Liebman, Sunnyvale, CA (US); Jonathan M. Garbarino, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 383 days.

(21) Appl. No.: 11/522,084

(22) Filed: Sep. 15, 2006

(51) Int. Cl.
*G11B 5/54* (2006.01)
(52) U.S. Cl. .................................... 360/265.2
(58) Field of Classification Search .............. 360/255.2, 360/265.4, 265.6, 266.1
See application file for complete search history.

(56) References Cited

U.S. PATENT DOCUMENTS

| | | | |
|---|---|---|---|
| 1,835,243 A | 12/1931 | Schaffert | |
| 2,060,970 A | 11/1936 | Belden | |
| 2,368,713 A | 2/1945 | Kane | |
| 2,499,315 A | 2/1950 | Johnson | |
| 3,076,668 A | 2/1963 | Famely | |
| 3,117,484 A | 1/1964 | Myers | |
| 3,202,034 A | 8/1965 | Korenchan | |
| 3,217,586 A | 11/1965 | Jaworski | |
| 3,273,444 A | 9/1966 | Houvener et al. | |
| 3,298,725 A | 1/1967 | Boteler | |
| 3,373,648 A | 3/1968 | Pitzer | |
| 3,515,418 A | 6/1970 | Nielsen, Jr. | |
| 3,550,244 A | 12/1970 | Vino et al. | |
| 3,603,626 A | 9/1971 | Whiteside | |
| 3,770,036 A | 11/1973 | Sherman | |
| 3,913,444 A | 10/1975 | Otte | |
| 4,029,426 A | 6/1977 | Sims, Jr. | |
| 4,243,339 A | 1/1981 | Dickerson | |
| 4,338,736 A | 7/1982 | Radigan | |
| 4,482,277 A | 11/1984 | Schiefer | |
| 4,508,467 A | 4/1985 | Choffin | |
| 4,602,902 A | 7/1986 | Herb | |
| 4,610,589 A | 9/1986 | Bredal | |
| 4,790,683 A | 12/1988 | Cramer, Jr. et al. | |
| 5,104,141 A | 4/1992 | Grove et al. | |
| 5,170,551 A | 12/1992 | Norberg | |
| 5,234,300 A | 8/1993 | Fluckiger | |
| 5,284,409 A | 2/1994 | Miyanaga | |
| 5,356,252 A | 10/1994 | Whistler, III et al. | |
| 5,413,441 A | 5/1995 | Heminger et al. | |
| 5,539,597 A | 7/1996 | Blanks | |
| 5,568,675 A | 10/1996 | Asami et al. | |
| 5,761,006 A * | 6/1998 | Sri-Jayantha et al. | .... 360/265.2 |
| 5,779,260 A | 7/1998 | Reilly et al. | |
| 5,828,521 A * | 10/1998 | Hasegawa | ................. 360/266.1 |
| 5,867,348 A * | 2/1999 | Suwa | ....................... 360/265.2 |
| 5,894,382 A * | 4/1999 | Hyde | ...................... 360/265.6 |

(Continued)

*Primary Examiner*—Mark Blouin
(74) *Attorney, Agent, or Firm*—Barcelo & Harrison, LLP

(57) ABSTRACT

A head stack assembly for use in a disk drive is provided that includes an actuator body, a rotary bearing, a sleeve, and a cam member. The actuator body is pivotable about an axis of rotation. The actuator body has an actuator bore that extends along the axis of rotation. The actuator bore includes an actuator bore surface. The sleeve is disposed between the rotary bearing and the actuator body and comprises a first surface that engages the actuator bore surface. The cam member has a second surface eccentric to said first surface. The second surface engages the actuator bore surface.

21 Claims, 10 Drawing Sheets

U.S. PATENT DOCUMENTS

| | | |
|---|---|---|
| 5,907,890 A | 6/1999 | Redaelli |
| 5,919,018 A | 7/1999 | Chuang |
| 5,999,373 A | 12/1999 | Allsup et al. |
| 6,018,441 A * | 1/2000 | Wu et al. ................. 360/265.6 |
| 6,053,655 A | 4/2000 | Mazhar |
| 6,128,165 A * | 10/2000 | Baker et al. ............. 360/265.6 |
| 6,288,879 B1 | 9/2001 | Misso et al. |
| 6,333,839 B1 | 12/2001 | Misso et al. |
| 6,480,363 B1 | 11/2002 | Prater |
| 6,519,116 B1 * | 2/2003 | Lin et al. ................. 360/265.6 |
| 6,655,847 B2 | 12/2003 | Obara et al. |
| 6,754,046 B2 | 6/2004 | Barina et al. |
| 6,856,491 B1 | 2/2005 | Oveyssi |
| 6,856,492 B2 | 2/2005 | Oveyssi |
| 6,925,715 B2 | 8/2005 | Ramsdell |
| 6,991,413 B2 | 1/2006 | Ballou et al. |
| 6,997,658 B2 | 2/2006 | Fly |
| 7,085,108 B1 | 8/2006 | Oveyssi et al. |
| 2002/0003993 A1 | 1/2002 | Ichimaru |
| 2002/0101688 A1 * | 8/2002 | Liu et al. ................. 360/265.2 |
| 2002/0118490 A1 | 8/2002 | Macpherson et al. |
| 2002/0131844 A1 | 9/2002 | Kefes |
| 2003/0053260 A1 | 3/2003 | Barina et al. |
| 2004/0095683 A1 * | 5/2004 | Dominguez et al. ...... 360/265.6 |
| 2004/0170484 A1 | 9/2004 | Pourtier |
| 2005/0152766 A1 | 7/2005 | Ballou et al. |

* cited by examiner

DISK DRIVE ACTUATOR ROTARY BEARING ATTACHMENT WITH CAM MEMBER

BACKGROUND OF THE INVENTION

1. Field of the Invention

This application is directed to methods and apparatuses for mechanically coupling a disk drive actuator body and a rotary bearing cartridge of a head stack assembly.

2. Description of the Related Art

Considerable markets exist for hard disk drives for mass-market host computer systems such as servers, desktop computers, and laptop computers. To be competitive in these markets, a hard disk drive must be relatively inexpensive, and must accordingly embody a design that is adapted for low-cost mass production. Low-cost mass production is facilitated by designs that can be easily assembled and re-worked if necessary. In addition, the drive must provide substantial capacity, rapid access to data, and reliable performance.

Satisfying competing constraints of low-cost, small size, high capacity, and rapid access requires innovation in each of numerous components and methods of assembly including methods of assembly of various components into certain subassemblies. A head disk assembly and a printed circuit board assembly are typical subassemblies of a hard disk drive. The head disk assembly includes an enclosure including a base and a cover, at least one disk having at least one recording surface, a spindle motor for causing each disk to rotate, and an actuator arrangement.

One conventional actuator arrangement is a rotary actuator, which consists of an arm that extends a head over the disk. The arm is pivoted about an axis by a pivot bearing assembly. Conventional pivot assemblies-to-actuator arm connections include press-fit engagement, coupling with set screws and other conventional fasteners. In some cases, an adhesive is located in the interface between the pivot bearing assembly and the actuator arm.

The foregoing techniques for interconnecting an actuator arm with a pivot bearing assembly may have significant drawbacks. For example, adhesives can emit gas into the enclosure, which can result in residue on the disk and damage to the heads, the disks, or the head-disk interface. Press-fit engagement involves application of a force between the pivot assembly and the actuator that can vary across the distribution of these components and can be excessive in some cases. In some cases, the force of the press-fit can result in scoring of the actuator bore and generation of particles within the enclosure. Fasteners such as set screws also can produce undesirable strain or particle generation, which can damage to the heads and the disks.

SUMMARY OF THE INVENTION

In one aspect, a head stack assembly is provided for use in a disk drive. The head stack assembly includes an actuator body, a rotary bearing, a sleeve, and a cam member. The actuator body is pivotable about an axis of rotation. The actuator body has an actuator bore that extends along the axis of rotation. The actuator bore includes an actuator bore surface. The sleeve is disposed between the rotary bearing and the actuator body and comprises a first surface that engages the actuator bore surface. The cam member has a second surface eccentric to said first surface. The second surface engages the actuator bore surface.

In another aspect, a pivot bearing cartridge is provided for facilitating rotary motion of a head-stack assembly in a disk drive. The pivot bearing cartridge includes a rotary bearing, a pivot sleeve, and a cam. The pivot sleeve is disposed about the rotary bearing and is pivotable therewith about an axis of rotation extending axially through the pivot cartridge. The pivot sleeve includes a first outside surface that extends about the axis of rotation. The cam is disposed about at least a portion of the pivot sleeve. The cam has a second outside surface that is eccentric to the first outside surface.

In some variations, the cam member is a ring that can be associated or coupled with the sleeve, e.g., in a recess formed in an outer surface thereof. The ring can have variable thickness along its length.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention.

DETAILED DESCRIPTION OF THE PREFERRED EMBODIMENTS

Figure 1:
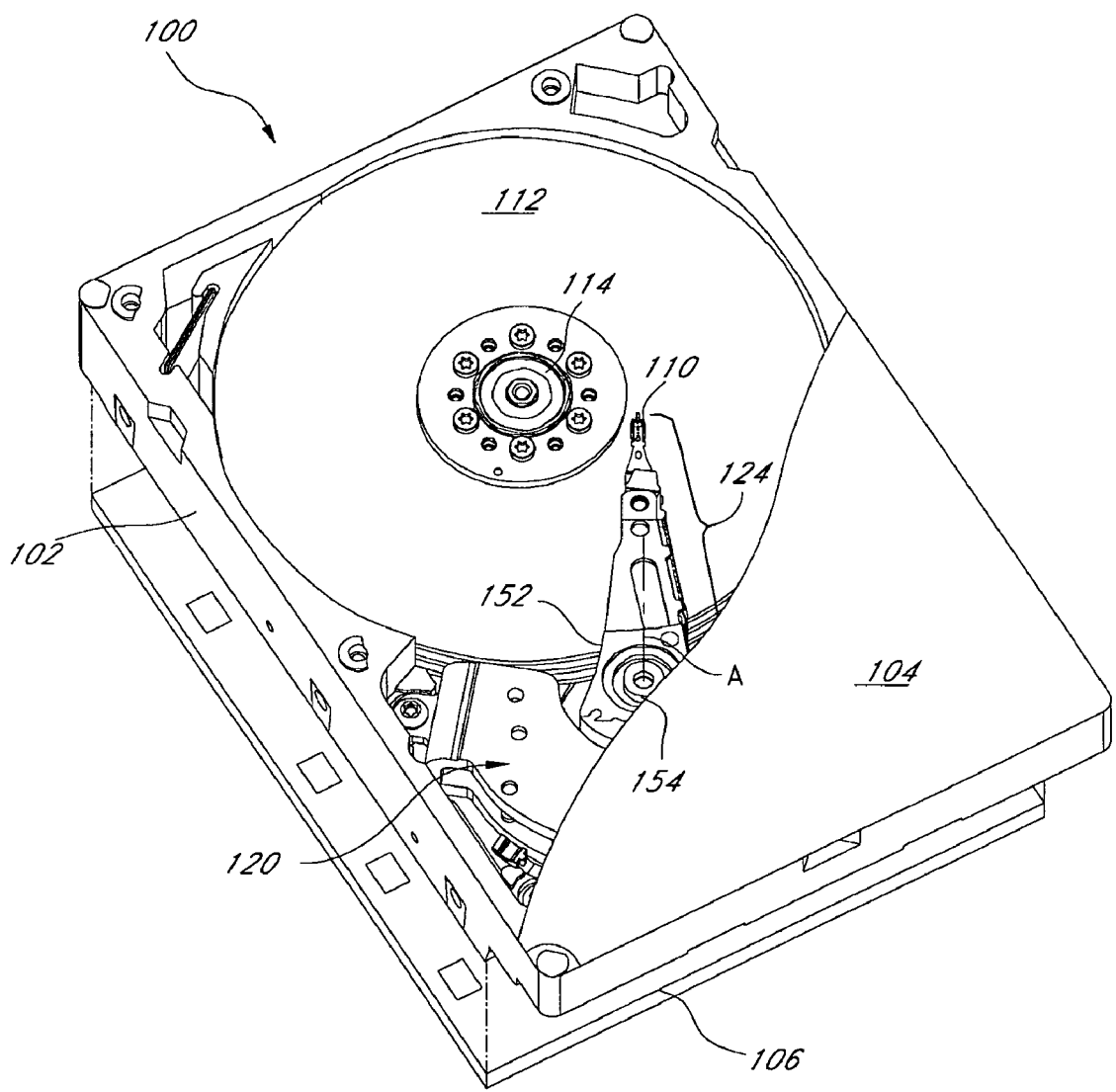
FIG. 1 is an exploded view of a disk drive incorporating a head stack assembly that includes a pivot bearing cartridge.
Figure 2:
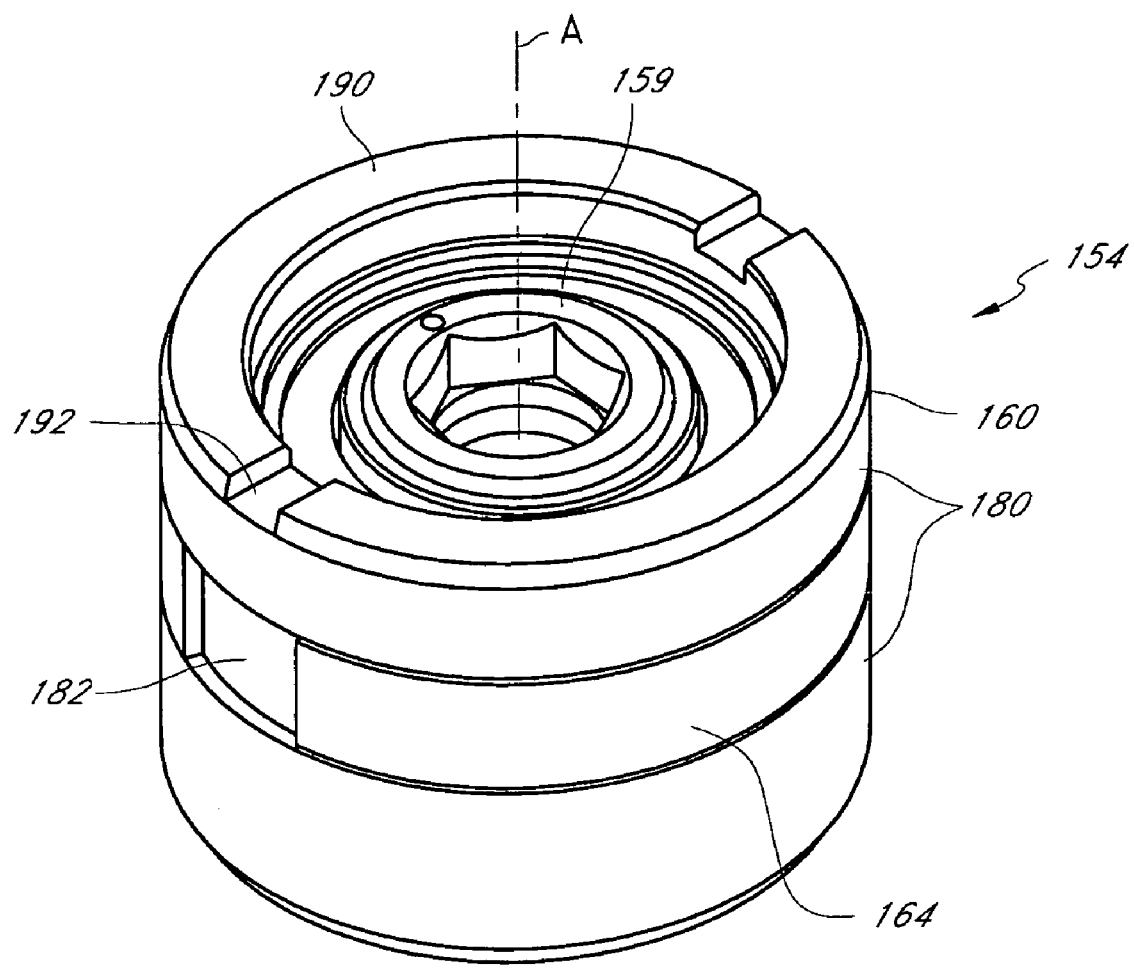
FIG. 2 is a perspective view of one embodiment of a pivot bearing cartridge for facilitating rotary motion of a head-stack assembly in a disk drive.
Figure 3:
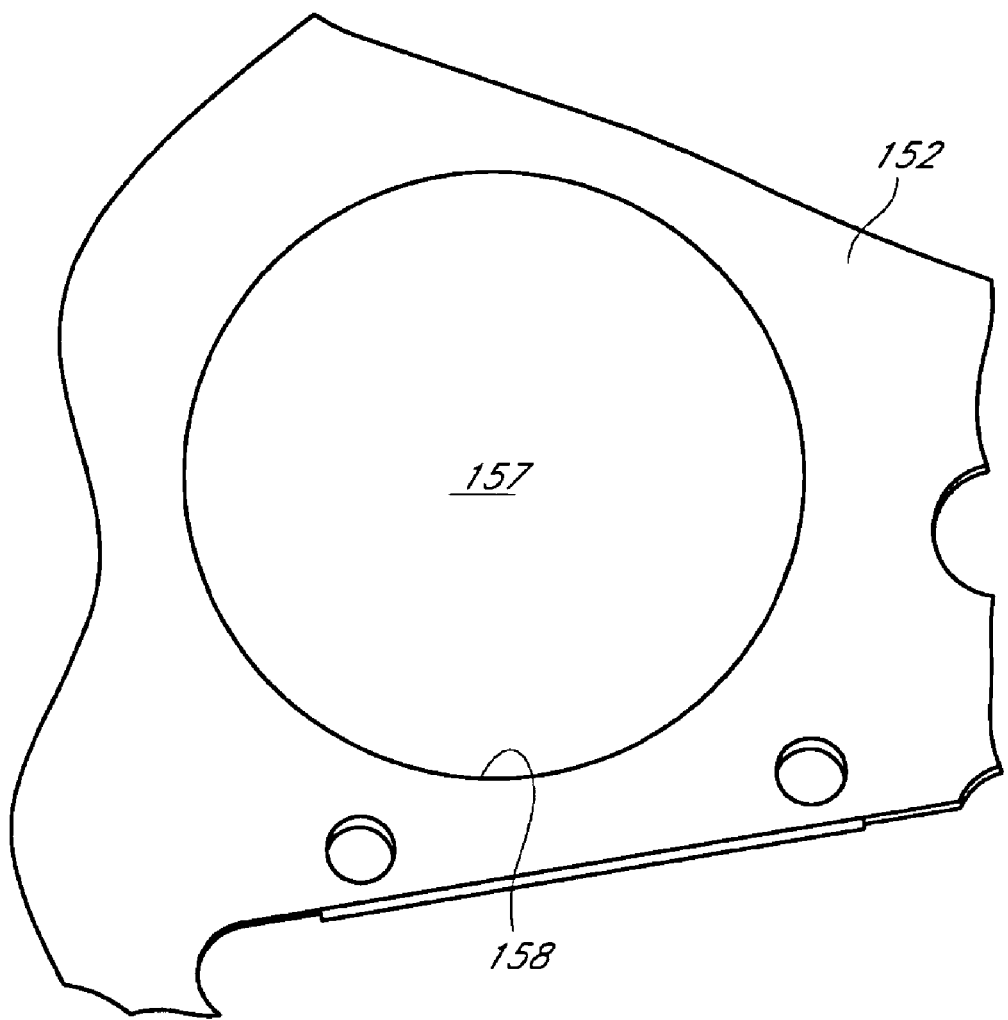
FIG. 3 is an enlarged view of a portion of an actuator body that can be coupled with the pivot cartridge of FIG. 2.

FIG. 1 shows a disk drive 100 that includes an enclosure including a base 102 and a cover 104. The enclosure normally is sealed (e.g., with a gasket) to provide a relatively contaminant-free environment for a head disk assembly (HDA) of the disk drive 100. The disk drive 100 also generally includes a printed circuit board assembly 106, which can be attached to base 102. The printed circuit board 106 includes circuitry for processing signals and controlling disk drive operations. The disk drive 100 includes at least one head 110 and at least one disk 112 having at least one recording surface. The head 110 may be a magnetic head which includes a magnetic read and/or write transducer, or may be an optical head or a magneto-optical head that includes an objective lens and/or a mirror. The disk 112 likewise may include a magnetic, optical, or magneto-optical recording and/or playback media. The disk 112 is supported by a spindle motor 114, which can be attached to the base 102. The spindle motor 114 rotates the disk 112 in a suitable manner.

The disk drive 100 also can include a rotary actuator 120 that positions the head 110 over a selected area of a recording surface of the disk 112. The rotary actuator 120 can includes a head stack assembly 124 supported by the base 102 to rotate about an axis of rotation A rotation of the head stack assembly 124 mover the head 110, as discussed further below.

In one arrangement, the head stack assembly 124 has an actuator body 152 and a pivot bearing cartridge 154. The pivot bearing cartridge 154 generally is disposed within the actuator body 152, e.g., in a bore 157 formed in the actuator body 152. The pivot bearing cartridge 154 can be an assembly of subcomponents in some embodiments, as discussed further below. The bore 157 can be at least partially surrounded by an actuator bore surface 158, which can be an integral surface of the actuator body 152 or can be an inner surface of a component disposed within the actuator body 152. In some arrangements, the actuator bore 157 extends along the axis of rotation A when the actuator body 152 is coupled with the pivot bearing cartridge 154. In some arrangements, the actuator bore surface 158 extends along, e.g., is symmetrically disposed about, the axis of rotation A when the actuator body is coupled with the pivot bearing cartridge 154. The actuator bore surface 158 includes a first surface in some arrangements that can be coupled with a second surface located in the pivot bearing cartridge 154. As discussed further below, the second surface can be disposed on a sleeve or a cam member disposed in the actuator bore 157.

As discussed further below, the actuator bore surface 158 can take any suitable configuration. In some embodiments, the actuator bore surface 158 is cylindrical or comprises a cylindrical portion, e.g., having a substantially constant radius of curvature between a top portion of the actuator body 152 and a bottom portion of the actuator body. The actuator bore surface 158 or a portion thereof includes a geometric center. For example, a central generally cylindrical portion of the actuator bore surface 158 has a geometric center located at the center of a radius of curvature thereof.

The pivot bearing cartridge 154 can be used to rotate the head-stack assembly 124 in the disk drive 100, as discussed above. The coupling of the actuator body 152 and the pivot bearing cartridge 154 can be through a sleeve that includes a cam member, a first embodiment of which is described below in connection with FIGS. 2-9 and a second embodiment of which is described below in connection with FIGS. 10-14.

In a first embodiment, the pivot bearing cartridge 154 includes a rotary bearing 159, a sleeve 160, and a cam member 164. The sleeve 160 can be a pivot sleeve in some embodiments. The sleeve 160 can have any suitable construction, such as a generally tubular or a cylindrical construction. The sleeve 160 can be coupled with the rotary bearing 156 in a conventional manner and is pivotable therewith about the axis of rotation A.

In one arrangement, the sleeve 160 includes an outer surface 180 that faces the actuator body 152 in the head stack assembly 124. The outer surface 180 has formed therein a groove or recess 182 in one embodiment. The recess 182 can take any suitable form to facilitate engagement of the sleeve 160 with the actuator body 152. In one arrangement, the recess 182 comprises a substantially cylindrical surface formed in the surface 180. The recess 182 preferably comprises an eccentric surface, e.g., a surface that is eccentric to the axis A. For example, the recess 182 can have a geometric center that is off-set from the axis of rotation A when the head stack assembly 124 is assembled. More particularly, the recess 182 can comprise a cylindrical surface that has a radius of curvature centered at a location that is off-set from the axis A. In another arrangement, the recess 182 has a non-circular arcuate perimeter, which can have a center off-set from the axis A. The degree of the eccentricity between the surface 180 and the recess 182 can be that sufficient to induce a camming action between the actuator body 152 and the pivot bearing cartridge 154. For example, in one embodiment, the degree of eccentricity is at least about 50 micron.

The recess 182 comprises a depth 184, which can be defined as a dimension extending from the surface 180 to a base of the recess 182. In one arrangement, the recess 182 has a substantially constant depth around the circumference of the sleeve 160. In some embodiments, the recess 182 is configured to receive at least a portion of the cam member 164. The recess 182 can be configured to receive a tapered cam member 164, e.g., a tapered cam ring, in one arrangement. As discussed in greater detail below, a constant depth recess can be paired with a cam member 164 that has a variable thickness. For example, a constant depth recess and variable thickness cam member could be used in a non-circular bore. In another embodiment, the recess 182 has a depth that varies around the circumference of the sleeve 160. A variable depth recess can be paired with a cam member 164 that has a constant or a variable thickness. In one embodiment, the depth 184 varies by at least about 20 micron. In another embodiment, the depth 184 varies by at least about 50 micron. In another embodiment, the depth 184 varies by at least about 10 micron.

The recess 182 can be located at approximately a mid-height of the sleeve 160, e.g., centrally along a height 186 of the sleeve 160. In one embodiment the sleeve 160 has a first end surface 188 that is disposed adjacent to the base 102 and a second end surface 190 that is disposed between the first end surface 188 and the cover 104 of the enclosure when the disk drive 100 is assembled. The recess 182 can be located about half-way between the first and second end surfaces 188, 190. In another embodiment, the recess 182 can be located closer to either the first or the second end surfaces 188, 190.

The sleeve 180 also can be configured to make assembly more efficient. For example, in some embodiments, the sleeve 180 includes a torquing feature 192 on an end surface thereof, e.g., at the second end surface 190. The torquing feature 192 can take any suitable form. For example, the torquing feature 192 can be a recess formed in the second end surface 190. In the illustrated embodiment, the torquing feature 192 includes two short recesses or slots disposed diametrically across the sleeve 160, on opposite sides of the second end surface 190. In some embodiments, the torquing feature 192 is configured to be engaged by a tool that can be used to apply a torque to the sleeve 160. The torquing feature 192 can be of another shape than that illustrated, such as a hex shape. As discussed further below, application of a torque to the sleeve 160 can cause the pivot bearing cartridge 154 to be engaged with the actuator body 152.

In the embodiment of FIGS. 2-9, the cam member 164 is a discrete member that is movable relative to the sleeve 160. The cam member 164 can be formed of any suitable material, such as a plastic suitable for use in a disk drive. In this embodiment, the cam member 164 can be a cam, a cam ring, or a ring member. The cam member 164 can have an arcuate perimeter, which can include a circular arc in some embodiments. The cam member 164 can comprise a first end 220, a second end 224, an inside surface 228, an outside surface 232. The cam member 164 can include an arcuate segment 236 extending between the first and second ends 220, 224 and a thickness 240 extending between the inside and outside surfaces 228, 232. A gap 230 extends between the first and second ends 220, 224 in one embodiment. The gap 230 allows the cam member 164 to be compressed somewhat, at least at the ends 220, 224. Such compression facilitates insertion of the pivot bearing cartridge 154 to be inserted into the bore 157 and engagement with the actuator bore surface 158 in one embodiment.

The thickness 240 can be configured to vary along the arcuate segment 236. In one arrangement, the thickness 240 increases along the arcuate segment 236 from adjacent to the first end 220 to adjacent the second end 224. In another arrangement, the thickness 240 of the cam member 164 increases along the arcuate segment 212 from adjacent to the second end 224 to adjacent the first end 220. In another arrangement, the thickness 240 of the cam member 164 increases along the arcuate segment 236 from adjacent to both the first and second ends 220, 224 toward a middle portion of the arcuate segment 236. In one embodiment, the thickness 240 varies between about 250 micron and about 350 micron. For example, at least one of the first and second ends 220, 224 can have a thickness of about 250 micron and a middle portion of the cam member 164 can have a thickness of about 350 micron. In one embodiment, the thickness 240 is at least about 250 micron. In one embodiment, the thickness 240 is no more than about 350 micron.

Figure 4A:
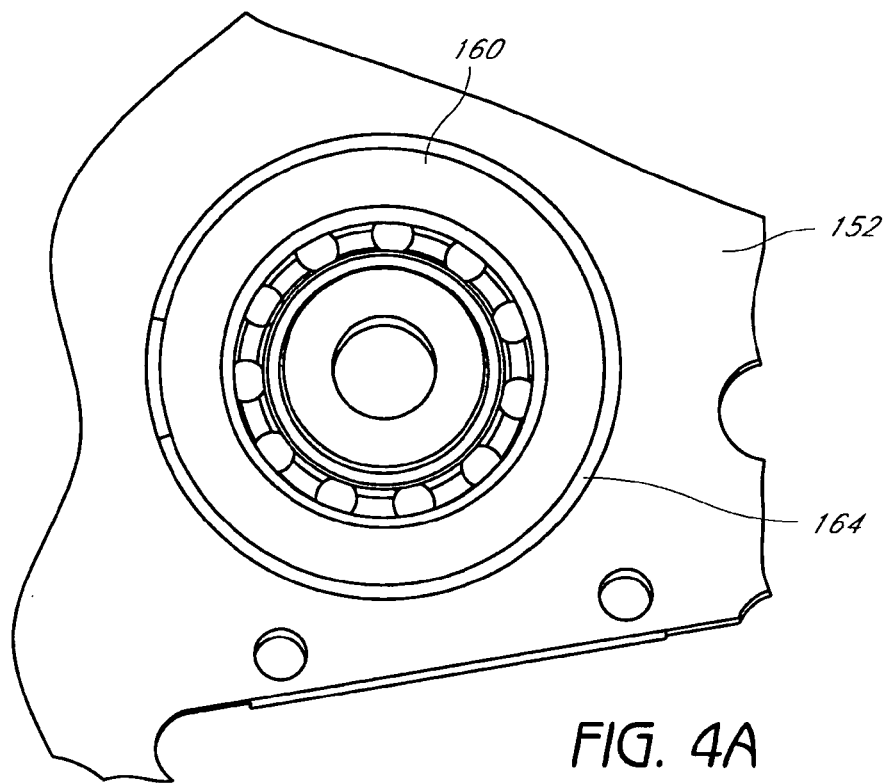
FIG. 4A is an enlarged cross-section view of a portion of a head stack assembly that incorporates the pivot bearing cartridge of FIG. 2 in a first stage of assembly.
Figure 4B:
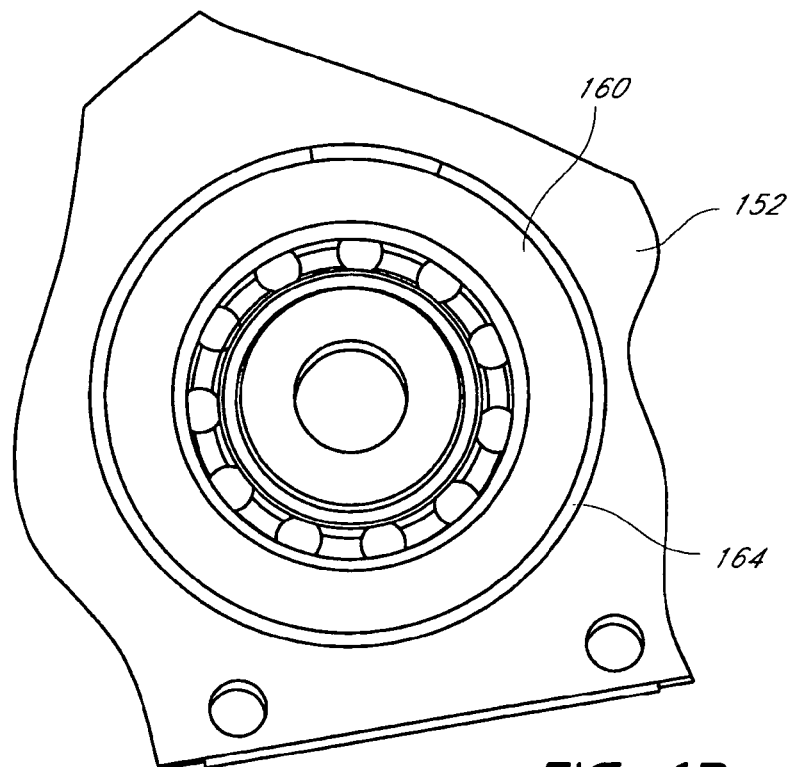
FIG. 4B is an enlarged cross-sectional view similar to that of FIG. 4A with the head stack assembly being in a second stage of assembly.
Figure 5:
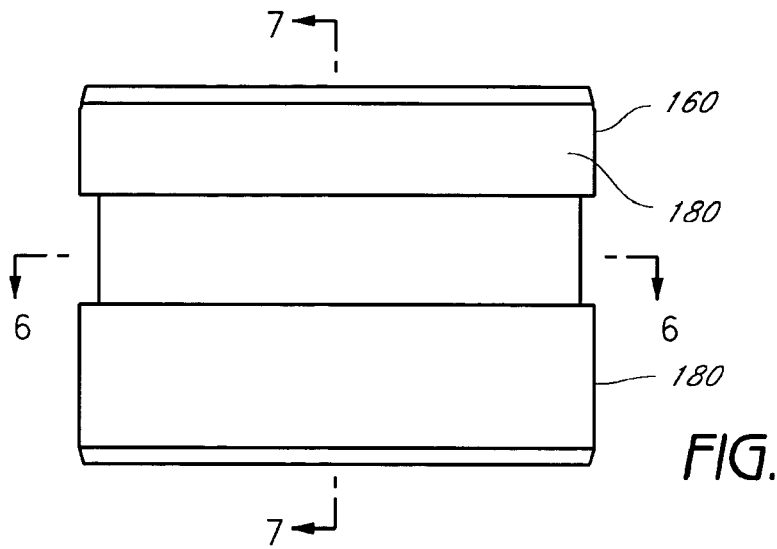
FIG. 5 is a plan view of one embodiment of a sleeve that can be used in the pivot bearing cartridge of FIG. 2.
Figure 6:
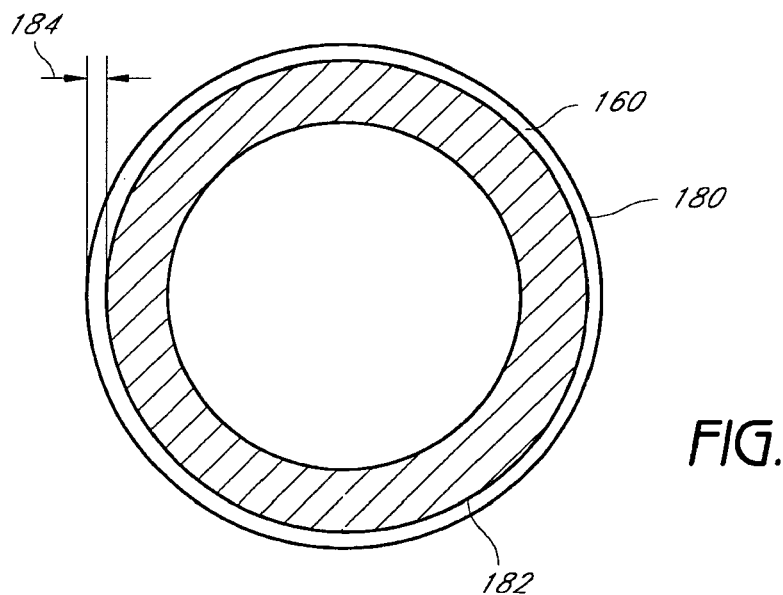
FIG. 6 is a cross-sectional view of the sleeve of FIG. 5 taken along plane 66.
Figure 7:
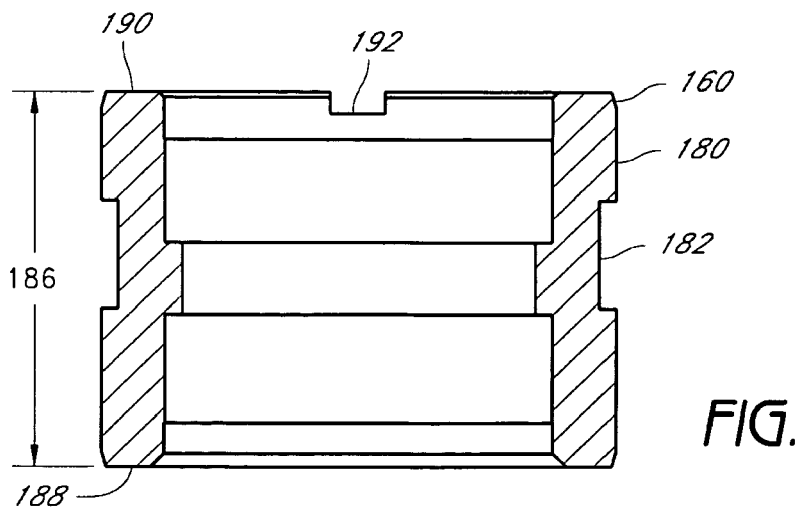
FIG. 7 is a cross-sectional view of the sleeve of FIG. 5 taken along plane 7-7.
Figure 8:
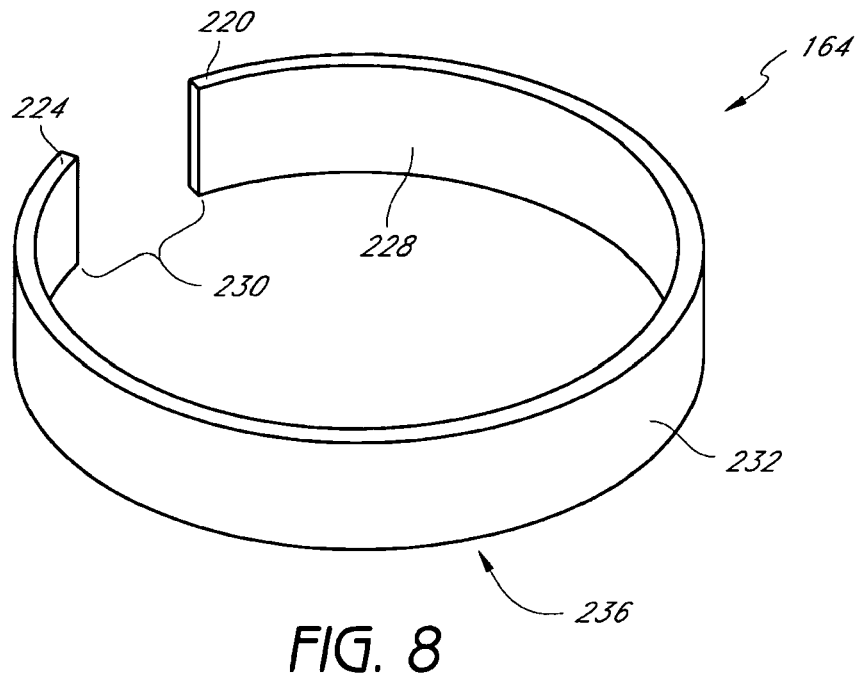
FIG. 8 is a perspective view of one embodiment of a cam member that can be used in the pivot bearing cartridge of FIG. 3.
Figure 9:
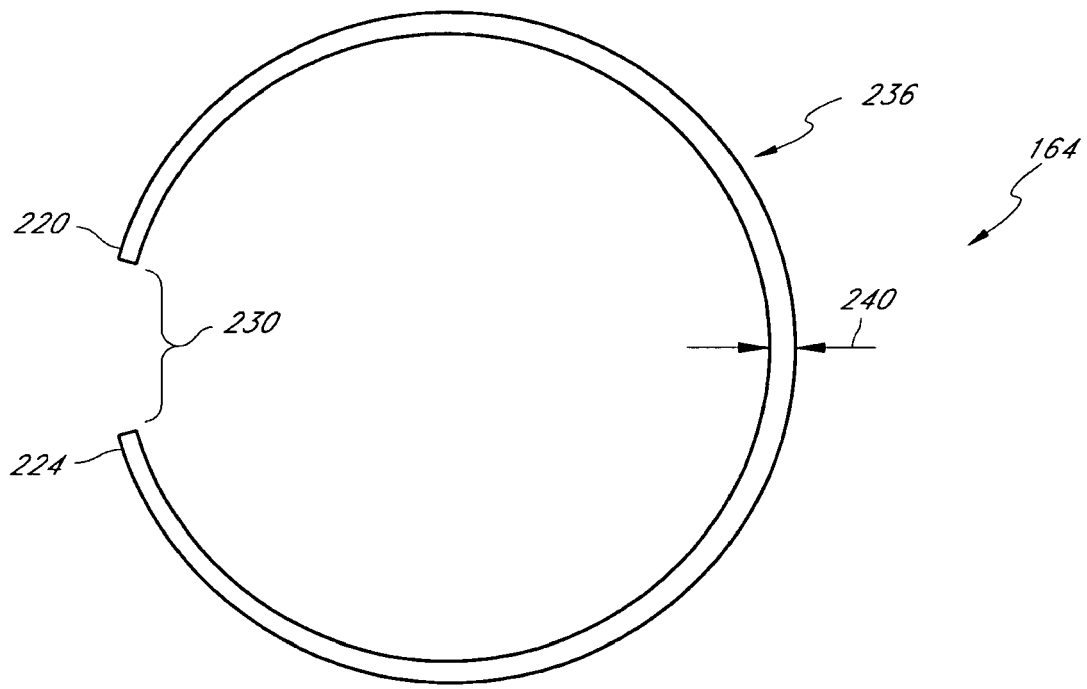
FIG. 9 is a top plan view of the cam member of FIG. 8.
Figure 10:
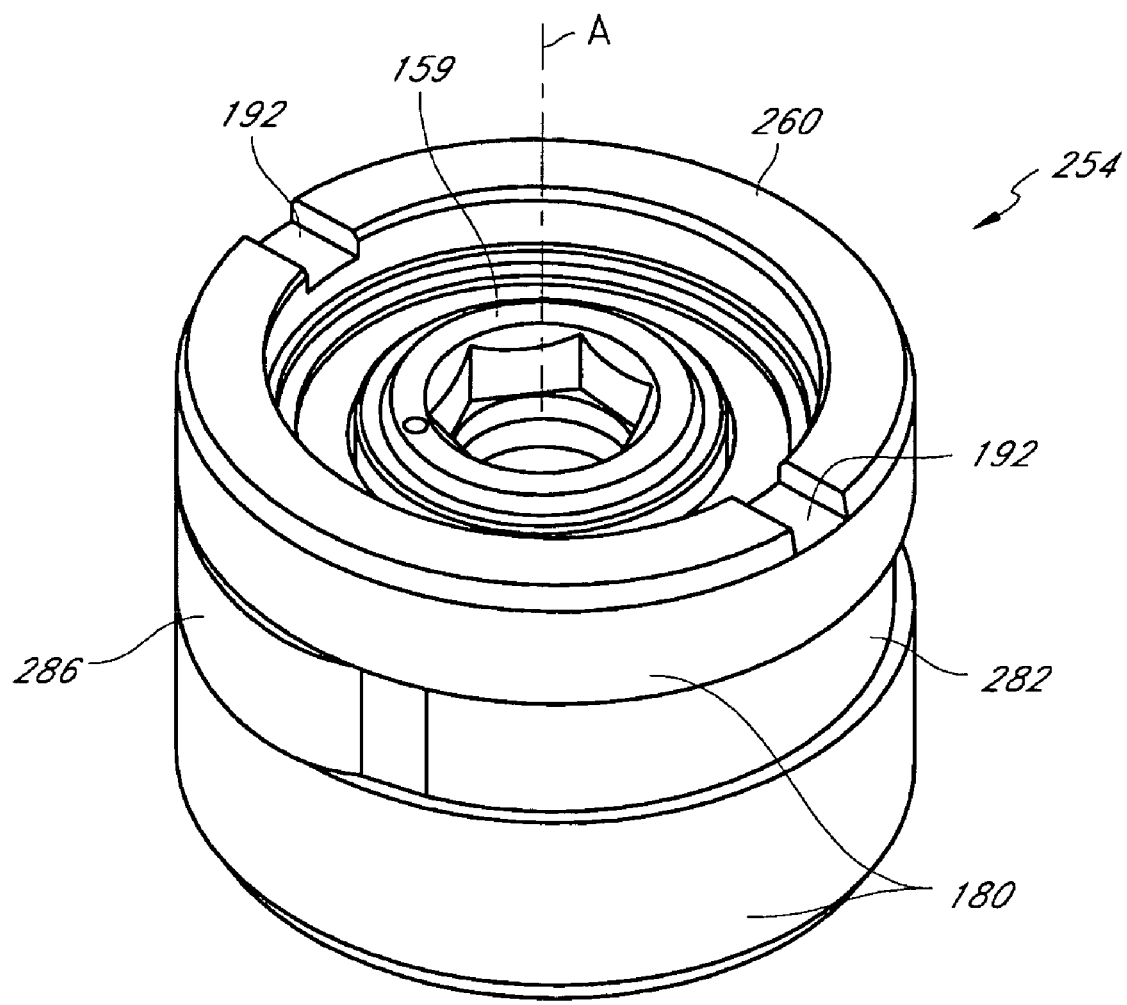
FIG. 10 is a perspective view of another embodiment of a pivot bearing cartridge.

FIGS. 4A and 4B illustrate various techniques for connecting the pivot bearing cartridge 154 with the actuator body 152. In one technique, the head stack assembly 124 is arranged such that the pivot bearing cartridge 154 can be installed into an actuator body with a cylindrical bore. In this technique, the depth of the recess 182 can vary around the circumference of the sleeve 160 and the thickness of the cam member 164 can vary along its length, as discussed above. Initially, a thicker portion of the cam member 164 can be disposed adjacent to a deeper portion of the recess 182. The recess 182 can be an eccentric groove or recess as discussed above. The deeper portion of the recess 182 and the thicker portion of the cam member 164 are constructed such that the outer profile of the pivot bearing cartridge 154 is smaller than the inner profile of the actuator bore surface 158 in the initial position.

For example, the outer surface 180 of the sleeve 160 could be cylindrical and the recess 182 and cam member 164 could be constructed such that the outside surface 232 of the cam member 164 does not extend radially beyond the cylinder containing the outer surface 180 of the sleeve 160. If the construction set forth in the preceding sentence were provided and the actuator bore surface 158 was formed with a radius at least as large as that of the outer surface 180, then the pivot bearing cartridge 154 could be installed axially into the actuator bore 157 with little or no force. Stated another way, a slight clearance preferably is provided in such a construction between the actuator body 152 and the pivot bearing cartridge 154. As such, the installation of the pivot bearing cartridge does not require substantial force to be applied along the axis A. This arrangement is sometimes referred to herein as a "slip-fit". In some embodiments, a clearance can be provided of up to and including about 20 microns between the actuator body 152 and the outer surface 180. The pivot bearing cartridge 154 can be located in the actuator body 152 in this manner, as is illustrated in FIG. 4A After the pivot bearing cartridge 154 is assembled to a suitable height (e.g., by use of at least one of a conventional assembly fixture and a flange of the pivot bearing cartridge), the pivot bearing cartridge can be rotated relative to the actuator body 152 to provide engagement there between. For example, a tool can be engaged with the torquing feature 192 to rotate the sleeve 160 and the pivot bearing cartridge 154 relative to the actuator body 152. In one arrangement, the torquing feature 192 is torqued to rotate the sleeve 160 at least about 45 degrees. In another embodiment, the torquing feature 192 is torqued to rotate the sleeve 160 from about 45 degrees to about 90 degrees. In another embodiment, the torquing feature 192 is torqued to rotate the sleeve 160 up to about 90 degrees. In another embodiment, the torquing feature 192 is torqued to rotate the sleeve 160 anywhere from about 30 degrees to about 180 degrees. In some applications, a suitable amount of torque is applied to the torquing feature 192. For example, a torque in the range of from about 1 in-lbs to about 5 in-lbs can be applied to the torquing feature 192 in some applications. In other application a torque of about 3.5 in-lbs is applied to the torquing feature 192.

As the sleeve 160 is rotated, the cam member 164 engages with, e.g., sticks to, the actuator bore surface 158. Such engagement can be facilitated by residual stress in the cam member 164 that tends to urge the cam member outwardly, away from the axis A. The residual stress can result from compression of the cam member 164, e.g., compression of the first and second ends 220, 224, as discussed above in one embodiment. Such engagement also can be facilitated configuring at least one of a surface of the cam member 164 and the actuator bore surface 158 to increase adherence, e.g., by making one or both of these surfaces rough. Such engagement also can be facilitated by providing one or more catch points or features on at least one of the cam members 164 and the actuator bore surface 158. Catch points or features can be machined into the actuator bore surface 158 at the anticipated height of the recess 182 or can be coupled therewith by any suitable technique.

Accordingly, rotation of the sleeve 160 rotates the eccentric groove while the cam member 164 is stationary in the actuator bore 157. This relative rotation causes the thicker portion of the cam member 164 to be disposed adjacent to, e.g., to overlie, a shallower portion of the recess 182. This arrangement produces a protruding portion on the pivot bearing cartridge 154 in a free state, e.g. but for the constraining effect of the actuator bore surface. In the head stack assembly, the protruding portion pushes against the actuator bore surface 158. This causes the surface 180 of the sleeve 160 of the pivot bearing cartridge 154 to be urged or wedged against the actuator bore surface 158, e.g., on the opposite side of the actuator bore 157 from the protruding portion of the cam member 164. In some embodiments, as discussed in greater detail below, the actuator bore surface 158 can comprise a notched portion or a scalloped portion to provide two lines of contact between the actuator body 152 and the sleeve 160. The notched or scalloped portion can be located on a side of the actuator bore 158 opposite a location of maximum interference between the cam member 164 and the actuator bore surface 158 for stability and repeatability.

FIGS. 10-14 illustrate additional embodiments suitable for coupling a pivot bearing cartridge 254 and an actuator body 252 in a head stack assembly that is similar to the head stack assembly 124, except as set forth differently below. The pivot bearing cartridge 254 is similar to the pivot bearing cartridge 154 except as set for differently below. The pivot bearing cartridge 254 includes a sleeve 260 that has an integral cam member 264. The cam member 264 biases, urges, or wedges the pivot bearing cartridge 254 against an actuator bore surface.

Figure 11A:
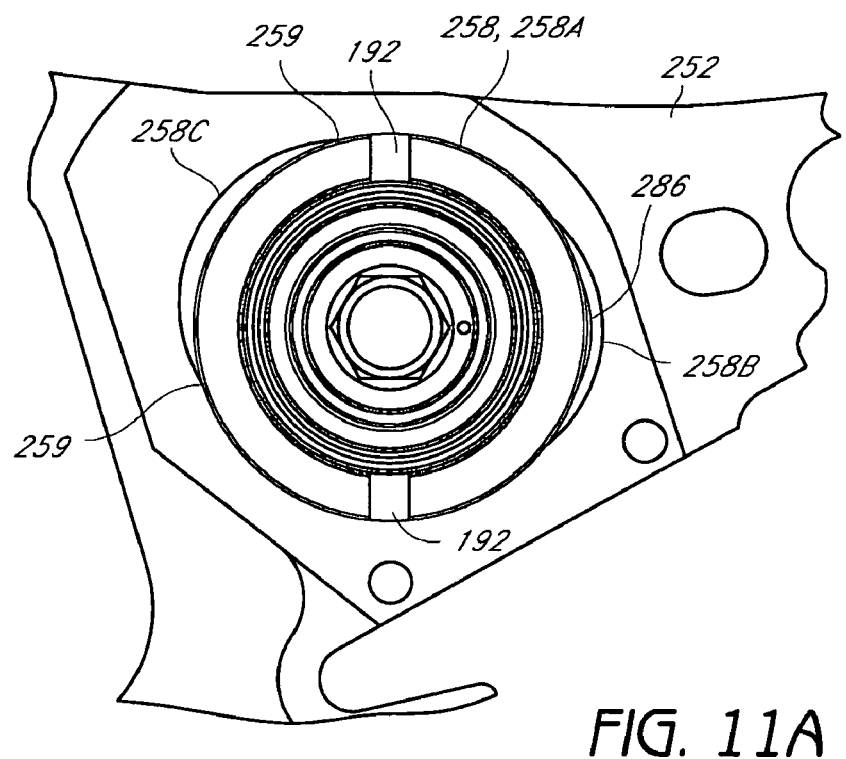
FIG. 11A is an enlarged view of a portion of a head stack assembly that incorporates the pivot bearing cartridge of FIG. 10 in a first stage of assembly.
Figure 11B:
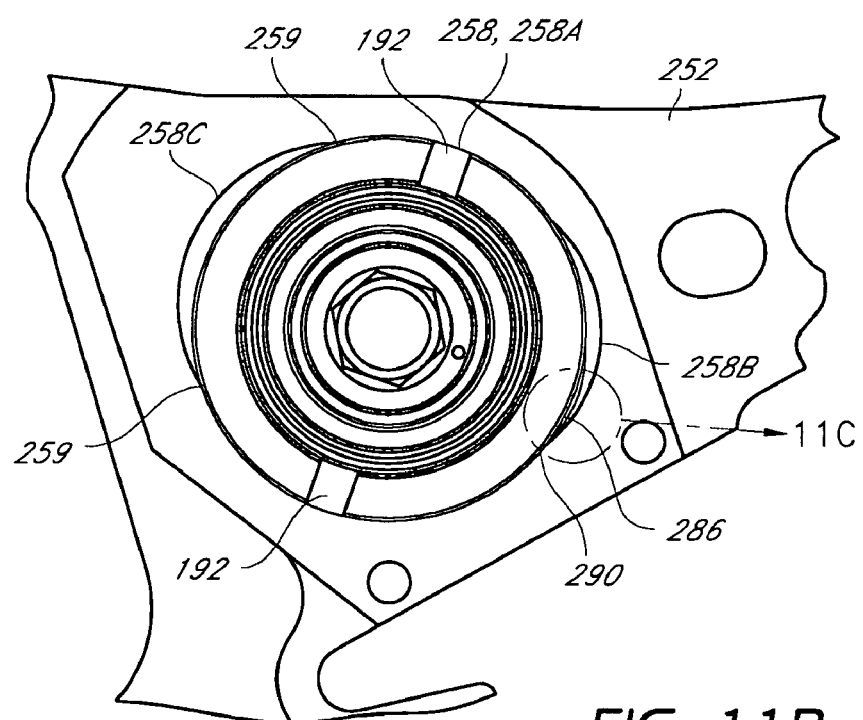
FIG. 11B is an enlarged view similar to that of FIG. 11A with the head stack assembly being in a second stage of assembly.

The actuator body 252 is similar to the actuator body 152 except as set for differently below. The actuator body 252 includes an actuator bore surface 258 that includes one, two or more than two notches or notch portions. FIGS. 11A and 11B show that in one embodiment the actuator bore surface 258 includes a central portion 258A, a first notch 258B, and a second notch 258C. As discussed further below, the notches 258B, 258C facilitate assembly of the actuator body 252 to the pivot bearing cartridge 254. The first notch 258B can be arranged to accept a protruding portion of the pivot bearing cartridge 254 during assembly. As discussed further below, the second notch 258C can be spaced along a perimeter of the actuator bore surface 258 from the first notch 258B. The second notch 258C can be arranged to engage the pivot bearing cartridge 154 in an advantageous manner, e.g., producing two-line contact therewith.

Where two-line contact is desirable, the actuator bore surface 258 can include two ridges 259 shaped to engage a surface of the pivot cartridge 254. In the illustrated embodiment, the ridges 259 are formed at the location where the second notch 258C meets the central portion 258A of the actuator bore surface 258. The ridges 259 can extend between top and bottom surfaces of the actuator body 252. In some embodiments, the ridges 259 extend from the top surface to the bottom surface of the actuator body 252. Where notches or scallops are provided, the central portion 258A can be provided with a generally cylindrical arrangement, comprising a radius of curvature with a center. In one assembly, the center of the radius of curvature of the central portion 258A is in the vicinity of, e.g., is intersected by, the axis A.

FIGS. 10-14 illustrate various structures that can be incorporated into the pivot cartridge 254 and into a head stack assembly including the actuator body 252. For example, the pivot cartridge 254 can include a sleeve 260 that is capable of providing locking engagement between the pivot cartridge 254 and the actuator body 152. The sleeve 260 is similar to the sleeve 160 except as set forth differently below. The sleeve 260 includes an integral cam member 264. The cam member 264 forms a portion of the sleeve 260 and is not movable relative to the sleeve 260. The cam member 264 includes a protruding portion 286 that protrudes from a recess 282 formed in the surface 180 of the sleeve 260. The protruding portion 286 extends to a radial location beyond the surface 180. In one embodiment, the protruding portion 286 protrudes by about 10 microns or more. In another embodiment, the protruding portion 286 protrudes by about 100 microns or more. The protruding portion 286 can be a surface that extends radially farther from the axis of rotation A than does a surface of the actuator body 252, e.g., the central portion 258A of the actuator bore surface 258.

FIGS. 11A and 11B depict pivot bearing cartridge 254 and actuator body 252. The first notch 258A in the actuator bore surface 258 allows axial insertion, e.g., sliding along the axis of rotation A, of the sleeve 260 and the pivot cartridge 254 relative to the actuator body 252, with little or no force. This arrangement can be described as a slip-fit. In one embodiment, a clearance suitable for such low force insertion is provided between the sleeve 260 and the central portion 258A of the actuator bore surface 258. Such a clearance could be about 20 micron or more. In certain cases, a smaller clearance also can be used. When the protruding portion 286 of the sleeve 260 is aligned with the first notch 258A, the sleeve 260 is in a first rotational position relative to the actuator bore 258. The first rotational position is illustrated in FIG. 11A.

Once pivot bearing cartridge 254 is sufficiently inserted, the torquing features 192 can be engaged by a tool and torque can be applied to the sleeve 260 causing the sleeve to rotate relative to the actuator body 252. Such rotation positions the sleeve 260 in a second rotational position relative to the actuator body 252. In the second rotational position, illustrated in FIG. 11B, an increased friction is generated between the sleeve 260 and the actuator body 252. The increased friction prevents the sleeve 260 from sliding relative to the actuator body 252 or the actuator bore formed therein along the axis of rotation A.

Rotation of the sleeve 260 from the first to the second rotational positions can be achieved by engagement of a tool with the torquing feature 192, which can include slots, as discussed above. The degree of rotation required can be any amount suitable, such as any amount or a range up to and including approximately 45 degree. Such rotation causes the protruding portion 286 to contact a ridge 290 defined between the first notch 258B and the central portion 258A of the actuator bore 258. Interaction between the protruding portion 286 and the ridge 290 urges or wedges the sleeve 260 against the actuator bore surface of the actuator body 252.

Preferably the interaction between the protruding portion 286 and the ridge 290 produce a stable connection between the actuator body 252 and the pivot bearing cartridge 254. Such a connection may be facilitated by two line contact at the ridges 259, as discussed above.

Figure 11C:
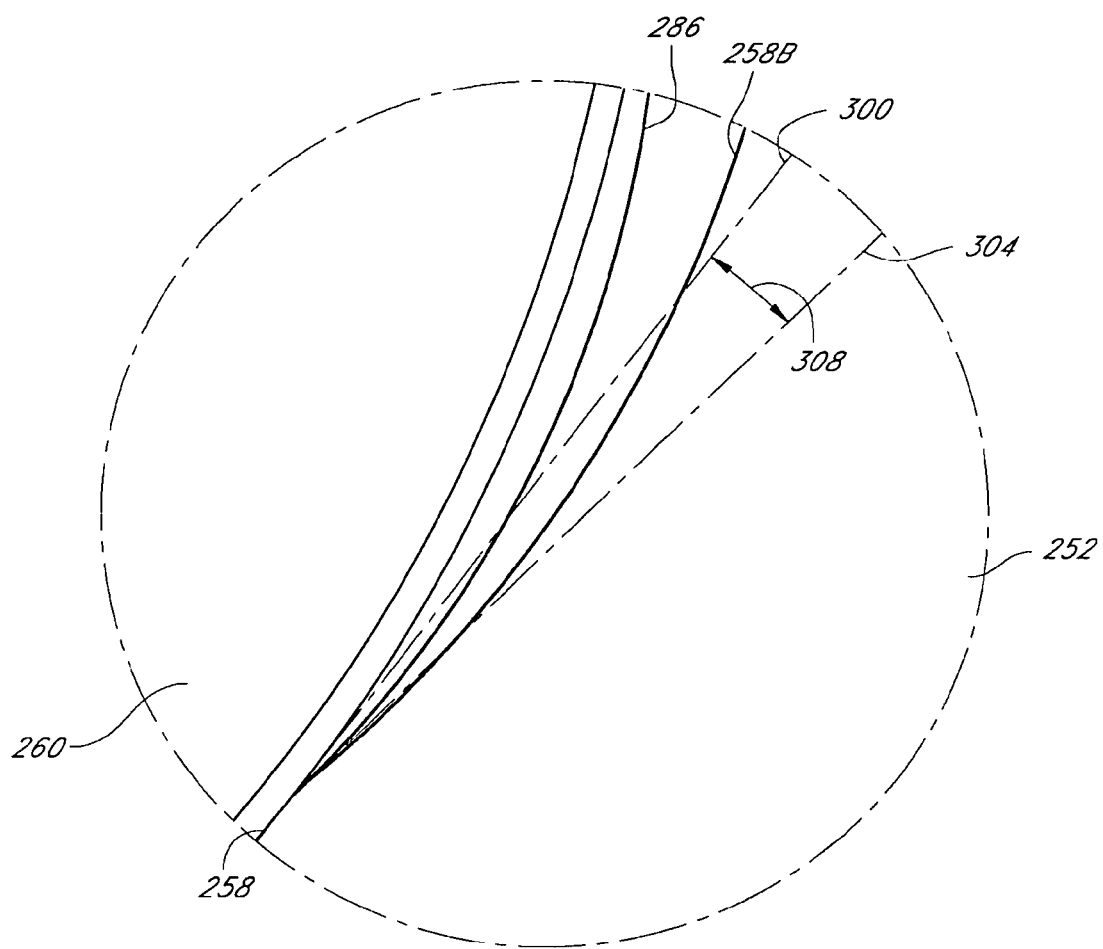
FIG. 11C is an enlarged detail view of a portion of a head stack assembly, illustrating small angle contact between an actuator body and a pivot bearing cartridge.
Figure 12:
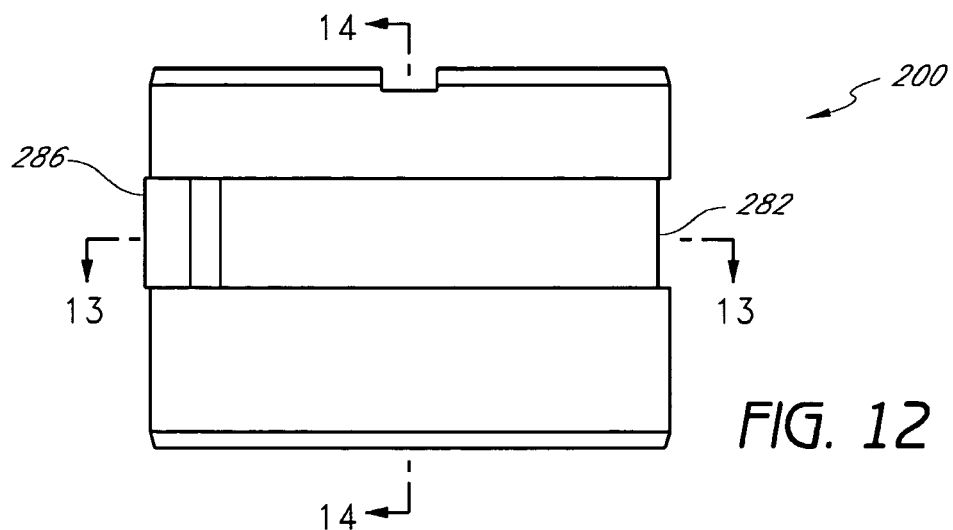
FIG. 12 is a plan view of a sleeve that can be incorporated into the pivot bearing cartridge of FIG. 10.
Figure 13:
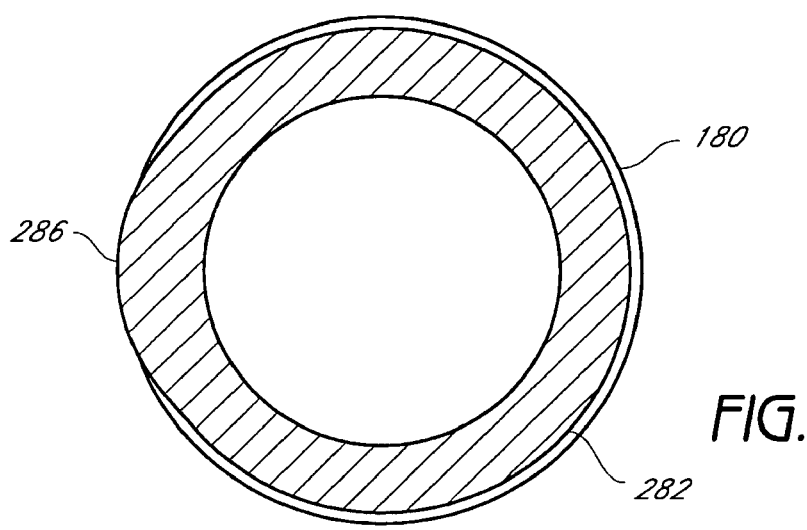
FIG. 13 is a cross-sectional view of the sleeve of FIG. 12 taken along plane 13-13.
Figure 14:
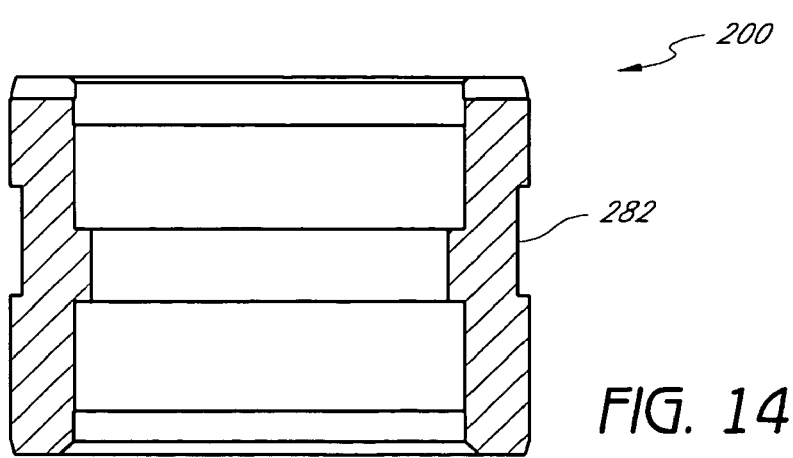
FIG. 14 is a cross-sectional view of the sleeve of FIG. 12 taken along plane 14-14.

Such a connection may also be facilitated by providing a small angle of contact between the protruding portion 286 and the ridge 290. The angle may be formed between a point of engagement between the protruding portion 286 and a tangent to a perimeter of the actuator bore in the actuator body 252. Suitable small angle contact will provide a self-locking engagement. FIG. 11C illustrates one technique in which a small angle 308 is provided between a tangent 300 to the central portion 258A of the actuator bore surface 258 at the ridge 290 and a tangent 304 to the protruding portion 386 at the point of contact thereof with the ridge 290. In some embodiments, the angle of engagement between the protruding portion 286 and the ridge 290 is up to about 8 degrees. In some embodiments, the angle of engagement between the protruding portion 286 and the ridge 290 is between about 1 degree and about 10 degrees. In some embodiments, the angle of engagement between the protruding portion 286 and the ridge 290 is about 4 degrees. In one variation, however, self-locking engagement is not provided, but the actuator body and the pivot bearing cartridge are further secured with a suitable fastener, such as a set screw.

The various devices, methods and techniques described above provide a number of exemplary ways to carry out the invention. It is to be understood that not necessarily all objectives or advantages described may be achieved in accordance with any particular embodiment described herein. Also, although the invention has been disclosed in the context of certain exemplary embodiments, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments described herein.

What is claimed is:

1. A head stack assembly for use in a disk drive, the head stack assembly comprising:
    an actuator body pivotable about an axis of rotation, the actuator body having an actuator bore extending along the axis of rotation, the actuator bore including an actuator bore surface;
    a rotary bearing;
    a sleeve disposed between the rotary bearing and the actuator body, the sleeve comprising a first surface that engages the actuator bore surface; and
    a cam member comprising a second surface eccentric to said first surface, the second surface engaging the actuator bore surface,
    wherein the first surface includes a recess, the cam member comprises a cam ring including said second surface, the ring being movable in said recess relative to the sleeve.

2. The head stack assembly of claim 1, wherein the first surface comprises a geometric center that is approximately intersected by said axis of rotation and the recess comprises a substantially cylindrical surface that comprises a geometric center that is off-set from said axis of rotation.

3. The head stack assembly of claim 1, wherein the first surface comprises a geometric center that is approximately intersected by said axis of rotation and the recess has a non-circular arcuate perimeter.

4. The head stack assembly of claim 1, wherein the cam ring has a first end, a second end, an inside surface, an outside surface, an arcuate segment extending between the first and second ends, and a thickness extending between the inside and outside surfaces, the thickness varying along the arcuate segment.

5. The head stack assembly of claim 4, wherein the thickness of the cam ring increase along the arcuate segment from adjacent to at least one of the first and second ends toward the other of the first and second ends.

6. The head stack assembly of claim 1, wherein the cam ring comprises a protruding portion that extends radially farther from the axis of rotation than does the first surface.

7. The head stack assembly of claim 6, wherein the actuator bore surface has a substantially cylindrical portion and a notch adjacent thereto, the notch accepting the protruding portion of the cam ring.

8. The head stack assembly of claim 7, wherein the first surface of the sleeve comprises a first radius and the substantially cylindrical portion of the actuator bore surface comprises a second radius larger than the first radius, and wherein protruding portion of the cam ring has a first perimeter and the notch has a second perimeter that is larger than the first perimeter.

9. The head stack assembly of claim 7, wherein the notch is a first notch and further comprising a second notch spaced along a perimeter of the actuator bore from the first notch, the second notch engaging the first surface of the sleeve.

10. The head stack assembly of claim 1, wherein said actuator bore surface comprises a catch member engagable with said cam ring to limit relative rotation between the cam ring and the actuator bore surface.

11. The head stack assembly of claim 10, wherein the catch member protrudes from said actuator bore surface toward said axis of rotation.

12. A head stack assembly for use in a disk drive, the head stack assembly comprising:
    an actuator body pivotable about an axis of rotation, the actuator body having an actuator bore extending along the axis of rotation, the actuator bore including an actuator bore surface;
    a rotary bearing;
    a sleeve disposed between the rotary bearing and the actuator body, the sleeve comprising a first surface that engages the actuator bore surface; and
    a cam member comprising a second surface eccentric to said first surface, the second surface engaging the actuator bore surface, wherein said sleeve comprises a torquing feature on an end surface thereof.

13. A head stack assembly for use in a disk drive, the head stack assembly comprising:
    an actuator body pivotable about an axis of rotation, the actuator body having an actuator bore extending along the axis of rotation, the actuator bore including an actuator bore surface;
    a rotary bearing;
    a sleeve disposed between the rotary bearing and the actuator body, the sleeve comprising a first surface that engages the actuator bore surface; and
    a cam member comprising a second surface eccentric to said first surface, the second surface engaging the actuator bore surface,
    wherein the sleeve has a first rotational position relative to the actuator bore in which the sleeve is slidable relative to the actuator bore along the axis of rotation and a second rotational position relative to the actuator bore in which an increased friction prevents the sleeve from sliding relative to the actuator bore along the axis of rotation.

14. A head stack assembly for use in a disk drive, the head stack assembly comprising:
    an actuator body pivotable about an axis of rotation, the actuator body having an actuator bore extending along the axis of rotation, the actuator bore including an actuator bore surface;
    a rotary bearing;
    a sleeve disposed between the rotary bearing and the actuator body, the sleeve comprising a first surface that engages the actuator bore surface; and
    a cam member comprising a second surface eccentric to said first surface, the second surface engaging the actuator bore surface,
    wherein an angle at a point of engagement between the second surface and a tangent to a perimeter of the actuator bore is about 8 degrees or less.

15. A pivot bearing cartridge for facilitating rotary motion of a head-stack assembly in a disk drive, the pivot bearing cartridge comprising:
    a rotary bearing; and
    a pivot sleeve disposed about the rotary bearing and pivotable therewith about an axis of rotation extending axially through the pivot cartridge, the pivot sleeve comprising a first outside surface extending about the axis of rotation; and
    a cam disposed about at least a portion of the pivot sleeve, the cam having a second outside surface being eccentric to said first outside surface,
    wherein the first outside surface includes a recess, the cam comprises a ring movable in said recess relative to the pivot sleeve, the ring including said second outside surface.

16. The pivot bearing cartridge of claim 15, wherein the first outside surface comprises a geometric center that is approximately intersected by said axis of rotation and the recess comprises a substantially cylindrical surface that comprises a geometric center that is off-set from said axis of rotation.

17. The pivot bearing cartridge of claim 15, wherein the first outside surface comprises a geometric center that is approximately intersected by said axis of rotation and the recess has a non-circular arcuate perimeter.

18. The pivot bearing cartridge of claim 15, wherein the ring has a first end, a second end, an inside surface, an outside surface, an arcuate segment extending between the first and second ends, and a thickness extending between the inside and outside surfaces, the thickness varying along the arcuate segment.

19. The pivot bearing cartridge of claim 18, wherein the thickness of the ring increase along the arcuate segment from adjacent to at least one of the first and second ends toward the other of the first and second ends.

20. The pivot bearing cartridge of claim 15, wherein the ring comprises a protruding portion that extends radially farther from the axis of rotation than does the first outside surface.

21. A pivot bearing cartridge for facilitating rotary motion of a head-stack assembly in a disk drive, the pivot bearing cartridge comprising:

a rotary bearing; and a pivot sleeve disposed about the rotary bearing and pivotable therewith about an axis of rotation extending axially through the pivot cartridge, the pivot sleeve comprising a first outside surface extending about the axis of rotation; and a cam disposed about at least a portion of the pivot sleeve, the cam having a second outside surface being eccentric to said first outside surface, wherein said pivot sleeve comprises a torquing feature on an end surface thereof.

\* \* \* \* \*